Jan. 16, 1968     T. WATKIN     3,363,334
EDUCATIONAL ARTICLE

Filed Aug. 30, 1965     4 Sheets-Sheet 1

INVENTOR.

*Theodore Watkin*

NUMERICAL VALUES

INVENTOR.
Theodore Watkin

Jan. 16, 1968     T. WATKIN     3,363,334

EDUCATIONAL ARTICLE

Filed Aug. 30, 1965     4 Sheets-Sheet 3

INVENTOR.

Theodore Watkin

Jan. 16, 1968 T. WATKIN 3,363,334
EDUCATIONAL ARTICLE
Filed Aug. 30, 1965 4 Sheets-Sheet 4
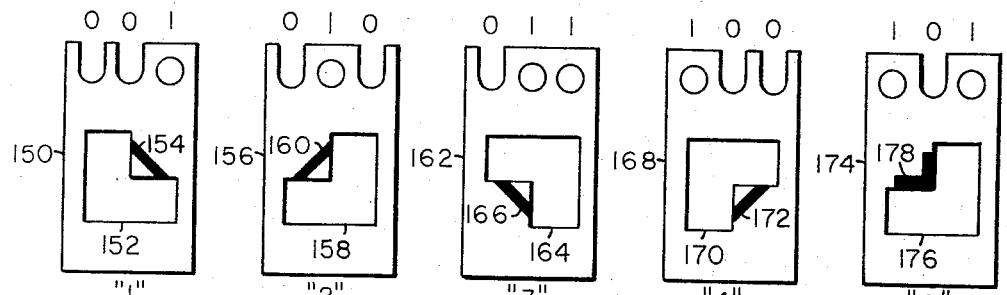
NUMERICAL VALUES
FIG. 11A  FIG. 11B  FIG. 11C  FIG. 11D  FIG. 11E  FIG. 11F
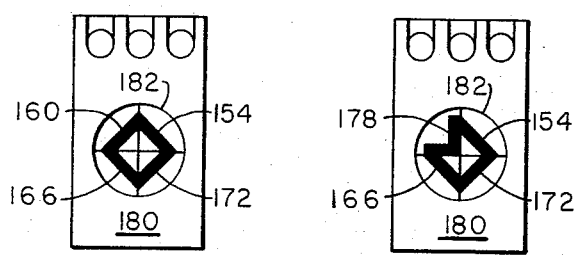
FIG. 12  FIG. 13
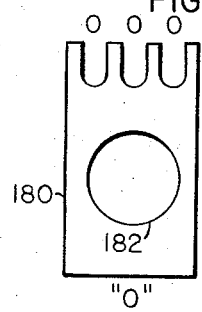
FIG. 15
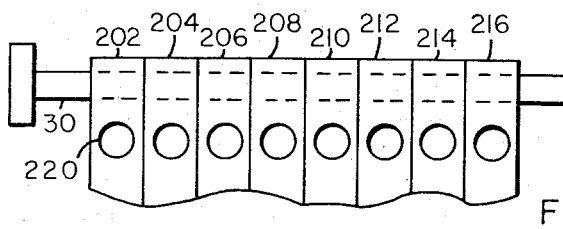
FIG. 14
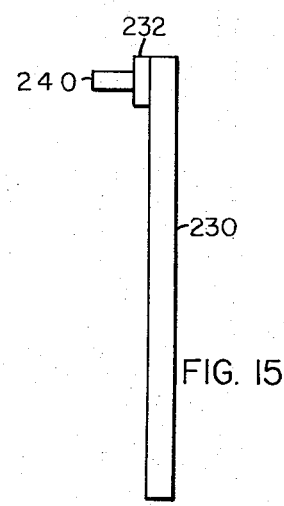
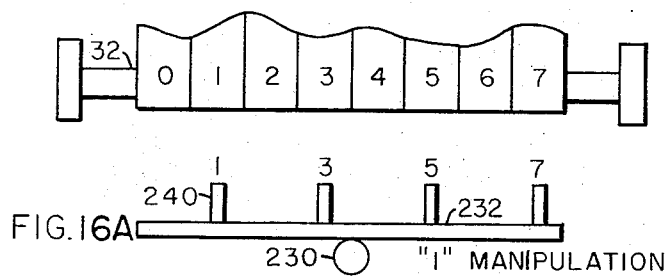
FIG. 16A  "1" MANIPULATION
FIG. 16B  "2" MANIPULATION
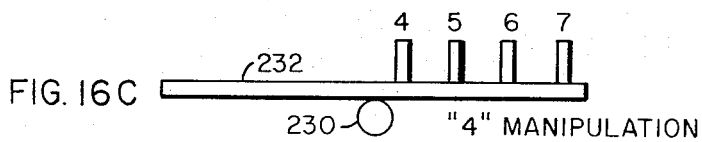
FIG. 16C  "4" MANIPULATION
INVENTOR.
Theodore Watkin

United States Patent Office 3,363,334
Patented Jan. 16, 1968

3,363,334
EDUCATIONAL ARTICLE
Theodore Watkin, 43 Hazelwood Lane,
Stamford, Conn. 06905
Filed Aug. 30, 1965, Ser. No. 483,447
21 Claims. (Cl. 35—28)

ABSTRACT OF THE DISCLOSURE

An artistic representation comprising a plurality of individual elements, each carrying a clearly discernible portion of said representation. The elements are provided with means for manipulation in accordance with binary precepts whereby changed artistic representations are achieved. The binary coding is present either on the elements or is supplied by a binary coded instrumentality used for manipulating the elements.

---

This invention refers broadly to a dichotomic device which is useful also as an educational article. Moreover, the present invention concerns an artistic representation which is adapted to be manipulated in accordance with certain precepts whereby changed representations are achieved.

More specifically, the present invention concerns an assemblage of elements, each element exhibiting an indicium, a picture element, or, more generally, an artistic representation. The respective representations of the elements form a larger design when the elements are disposed as an assemblage, and such larger design is subject to various permutations as the elements in the assemblage are shifted in accordance with binary concepts.

Quite specifically, the present invention concerns an article comprising a plurality of picture bearing elements which are supported in a supporting means. The picture portion, or design, on each of the elements merges into a larger representation when the elements are disposed as an assemblage in the supporting means. In a typical embodiment, each of the elements is coded to exhibit a binary notation, and the various elements forming the particular assemblage have different binary notation. The elements are adapted to be manipulated by a sorting instrument whereby certain elements, which are selected in accordance with binary precepts, are removed from the assemblage and restored in the assemblage in shifted position. This manipulation causes a different overall representation. Using binary sorting techniques, various designs are obtainable so that the article is useful as an educational device, as a teaching aid, as well as an amusement device.

One of the principal objects of this invention is, therefore, the provision of a new and novel dichotomic device.

Another one of the principal objects of this invention is the provision of an article which is useful for educational and instructional purposes and which is usable also as an artistic device to provide pleasure and enjoyment.

Another object of this invention is the provision of a plurality of picture bearing elements which are manipulatable in accordance with the binary code theory, the elements being manipulated by a sorting instrument in response to such code to provide thereby a series of different arrangements of the elements and, thus, provide changeable pictorial representations responsive to the arrangement of the elements.

Another object of this invention is the provision of an educational article which is readily adapted for demonstrating and teaching binary number theory.

A further object of this invention is the provision of an education article for demonstrating binary sorting principles.

A still further object of this invention is the provision of an article which is essentially an artistic representation comprising coded picture elements which may be shifted in accordance with binary precepts to provide changed representations.

Further and still other objects of this invention will be more readily apparent by reference to the following description when taken in conjunction with the accompanying drawings in which:

FIGURES 11A through 11F are top plan views of individual elements which form a further embodiment;

FIGURE 12 is a top plan view of the elements per FIGURE 11 stacked and arranged in the starting numerical sequence;

FIGURE 13 is a top plan view of the elements after a certain manipulation;

FIGURE 14 is an elevational view of a still further embodiment of the invention;

FIGURE 15 is an elevational side view of the instrument used for manipulation in conjunction with the elements per FIGURE 14; and FIGURES 16A through 16C are respective top plan views of the instrument per FIGURE 15.

Figure 1:
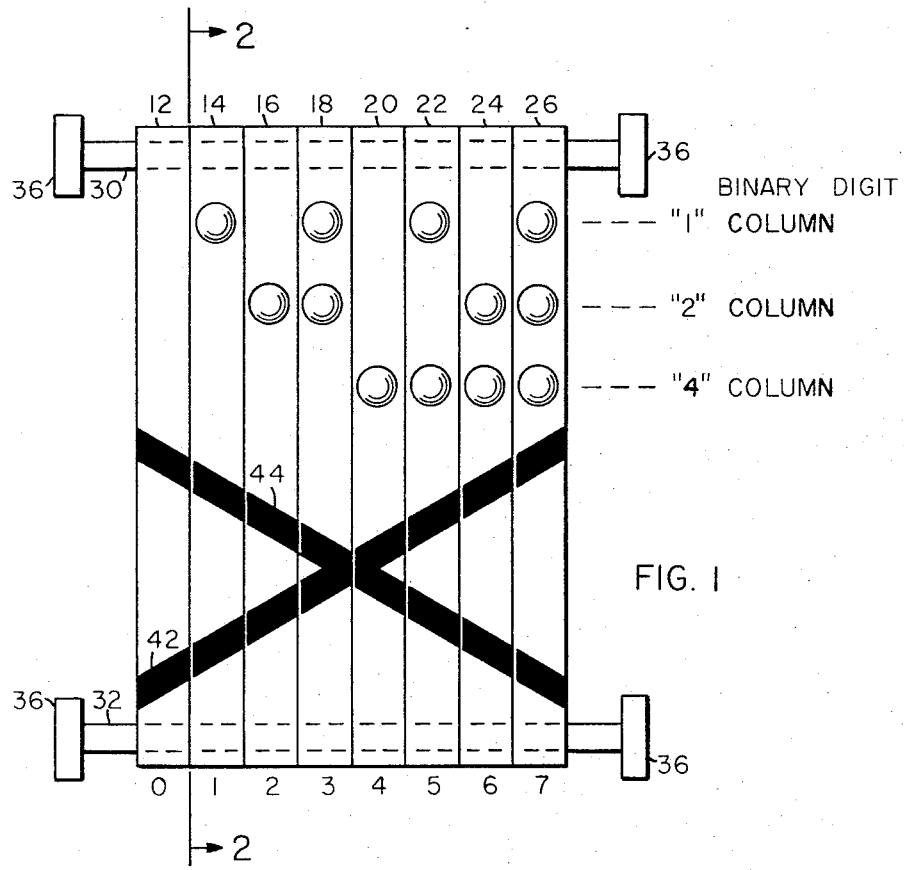
FIGURE 1 is a front elevational view of a typical embodiment of the invention.
Figure 2:
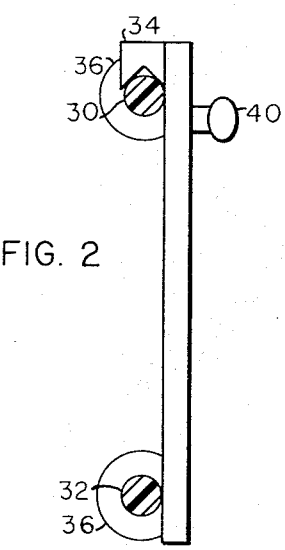
FIGURE 2 is a view along line 2—2 in FIGURE 1.

Referring now to the figures and FIGURES 1 and 2 in particular, which show a first preferred embodiment, there is shown an assemblage of eight vertically depending, elongated elements, numerals 12, 14, 16, 18, 20, 22, 24 and 26, which are supported by a set of horizontal rails 30 and 32. As seen in FIGURE 2, each element is in the form of a bar, made for instance of wood or metal, and is provided with a shoe 34 having a V-shaped recess for engaging the upper rail 30. The lower rail 32 serves as a rest for the lower portion of the elements. Each element is mounted to be slid along the axis of the rails. Caps 36 disposed at the end of the rails serve as a stop. The rails may be mounted to a vertical wall by suitable means, not shown.

Each of the elements is assigned a numerical value from "0" to "7" in binary form. To accomplish this, each of the elements has a "1" column position, a "2" column position, and a "4" column position, the column positions from "1" to "4" being disposed along the length of each element at the upper portion thereof, as seen in FIGURE 1. Positions of equal numerical value of respective elements are arranged in a row, the rows, denoting respective binary columns, run crosswise through the assemblage as shown.

In order to code each element with a binary number, knobs 40, similar to a door knob, are provided which protrude from the surface of the associated element. Therefore, the element 12, having a numerical value of "zero," has no knob. The element 14, being assigned a value of "one," is provided with a knob 40 in the "1" column position to denote the binary digit notation of "001." Similarly, the element 16 has a knob or digit at the "2" column position to denote the binary digit notation "010"; the element 18 has a first knob at the "1" column position and a second knob at the "2" column position to denote the binary notation "011," the numerical value of "3," and so forth, as is well known in the art of binary number theory. The absence of a digit, or the binary "0" notation, is provided by the absence of a knob 40 at the respective column position or positions.

Each of the elements is provided with a clearly discernible graphic representation, such as the portion of a stripe 42 on the element 12 and the striped portion 44 on the element 16. These graphic representations form a part of an overall pictorial or artistic representation when the elements are juxtaposed and disposed as an array, such as is seen in FIGURE 1. In the typical example shown, when the elements are in the numerical sequence from "0" to "7," two inclined stripes traverse the assemblage without a break. Instead of stripes, there may be provided an artistic representation of circles, musical notes, three-dimensional characters, or indicia in general.

Figure 3:
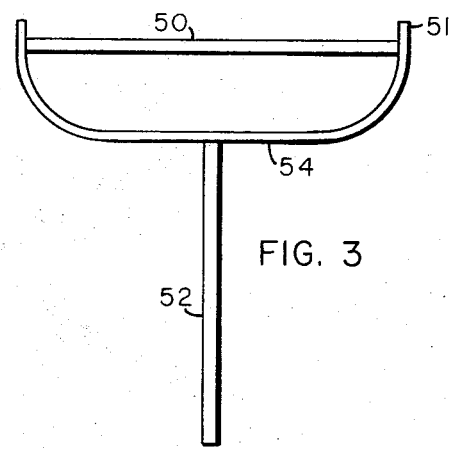
FIGURE 3 is an elevational view of the instrument used for manipulating the elements shown in the embodiment of FIGURE 1.

This assemblage of elements may be manipulated in accordance with binary precepts by the use of a sorting instrument as seen in FIGURE 3. The instrument comprises a horizontal bar 50 which is joined to a handle 52 by means of a loop 54. The length of the bar 50 is dimensioned so that it is longer than the width of the juxtaposed elements of the array. Also, the elements may be slid along the bar 50. Stops 51 are provided to prevent the elements from sliding off the bar during manipulation, as explained hereafter.

Figure 4:
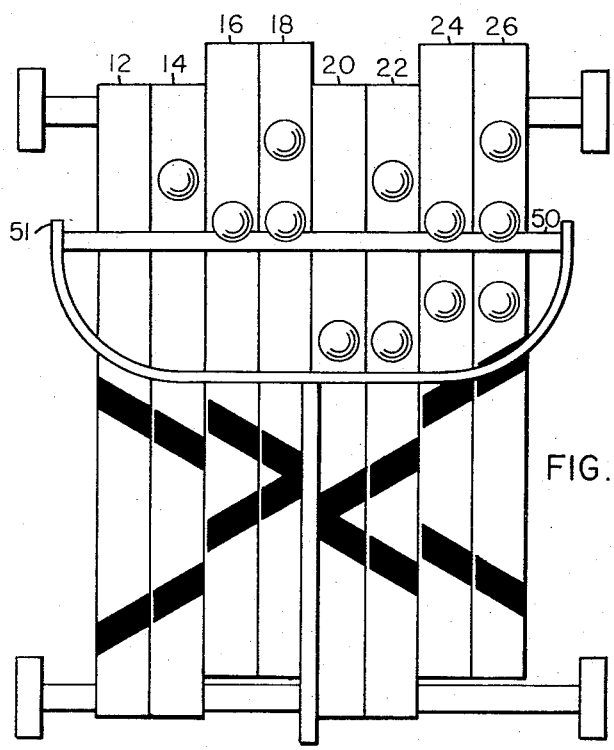
FIGURE 4 is an elevational view of the embodiment per FIGURE 1 with the instrument in the process of manipulating certain selected elements.
Figure 6:
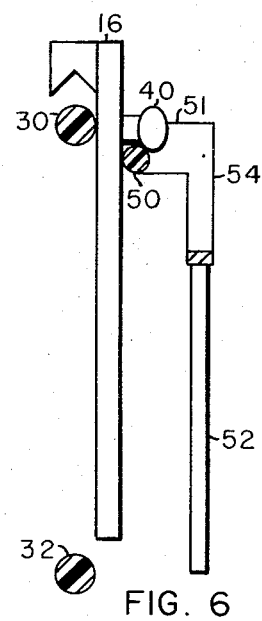
FIGURE 6 is a side view, depicting the instrument in the process of lifting the elements.
Figure 5:
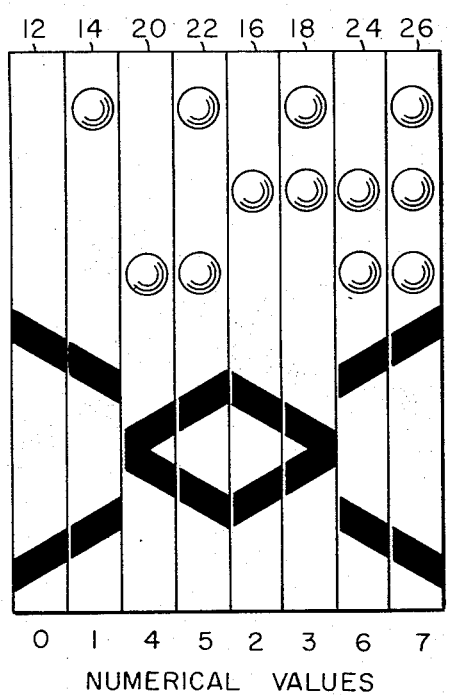
FIGURE 5 is an elevational view showing the changed artistic representation per FIGURE 1 subsequent to the manipulation.

Manipulation of the elements by means of the sorting instrument is illustrated in FIGURES 4 and 5. Assuming that all the elements having a binary digit "2" notation are to be shifted, the instrument is brought into engagement with the array in such a manner that the horizontal bar 50 of the instrument engages the shank of all knobs 40 which are disposed at the "2" column position. See typical illustration per FIGURE 6.

Hence, the instrument engages the elements 16, 18, 24 and 26, which are valued respectively "2," "3," "6" and "7," or in binary notation "010," "011," "110" and "111." By means of the sorting instrument, these elements are now lifted off the rail 30 and away from the rail 32, and thereby temporarily moved out of the array. The elements remaining in the array are those which lack a binary digit at the "2" column position. The removal of the four elements leaves a gap between the elements 14 and 20. The elements remaining on the rails are now slidably shifted toward the left whereby to close this gap and bringing all of the elements in juxtaposition. Then, the removed elements 16, 18, 24 and 26, still supported on the instrument, are restored in the same numerical sequence as removed on the rails by hooking them on to the upper rail 30 at the empty right side of the array. Next, the instrument is withdrawn and, upon closing any existing gaps between the plurality of elements, an assemblage as shown in FIGURE 5 is achieved, the elements being in the sequence 12, 14, 20, 22, 16, 18, 24 and 26. This figure is characterized by a new overall design representation, produced by the shift in a quantity of the individual picture bearing elements. This "sorting" operation may be continued either at random or according to a plan whereby to provide new and changed artistic representations. Using known binary sorting techniques, the elements can readily be restored to the design per FIGURE 1, using only the sorting instrument and always adding removed elements at the right or left side of the array. In this way this article is well suited to teach and demonstrate binary sorting and collating principles.

While the individual elements may be slidably moved along the bar 50 to facilitate manipulation, the elements are not taken out of their respective sequence when standard binary sorting routines are adhered to.

Hence, it is readily possible to demonstrate how a randomly shuffled array may be sorted so that the elements are brought again into numerical sequence, using only the sorting instrument and following predetermined routines. Additionally, different artistic representations can be expressed by a series of binary sorting operations and produced by executing such sorting operations.

It will be apparent that the array of elements may readily comprise more than the eight elements numbered "0" through "7." In fact, arrays have been constructed which comprise elements numbered "0" through "15" and it will be apparent that the larger the quantity of elements the greater the number of permutations which are available.

While the elements 12, 14 and the like, as shown in FIGURE 1, may be made of wood, plastic, metal, etc., and, therefore, are rigid, it will be apparent that the same effect can be achieved with flexible material such as drapery material which, if desired, may be provided with a weight at the bottom. Moreover, the knobs 40 are merely illustrative of typical hardware items which may be used, and other suitable items, e.g., hooks, may be substituted without deviating from the design disclosed.

Figure 7:
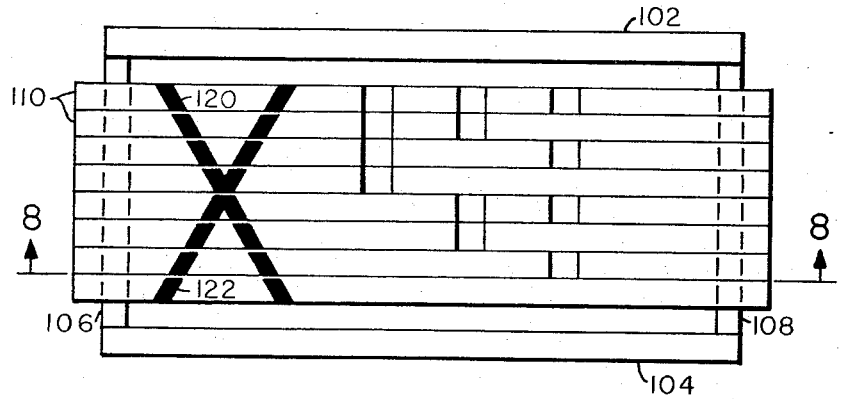
FIGURE 7 is a top plan view of an alternative embodiment of the invention.
Figure 8:
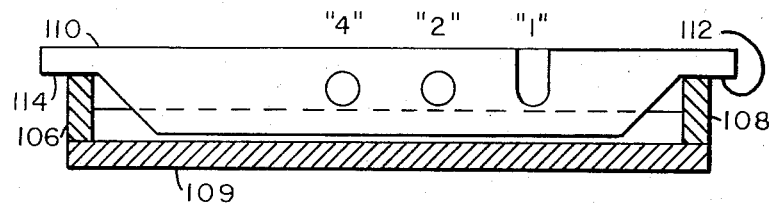
FIGURE 8 is a sectional view along line 8—8 in FIGURE 7.

An alternative embodiment is shown in FIGURES 7 and 8. There is shown an open box comprising four upstanding sides 102, 104, 106, 108, and a bottom plate 109. This box contains an array of slat-like elements 110. The elements are provided with extensions 112 and 114 for slidably moving along the top surface of sides 106 and 108 from the front to the rear. The front side 104 and the rear side 102 of the container are of a lower height in order to expose the digital code associated with each element. In FIGURE 8 a typical element is shown having a binary code of "110," that is "4" plus "2," a numerical value of "6." The presence of a binary digit is indicated by a circular aperture through the side of the element, while the absence of a digit is denoted by a slot. See binary digit column positions "1" and "4." The binary digit column positions run from right to left and, again as before, positions of equal digital value of the different elements are aligned with respect to each other to form parallel rows which run from the front to the rear in the array, or crosswise to the column positions. In this particular embodiment, the digit notation is disposed in the side of each element while the pictorial representation of each element is on the narrower top surface, as shown by numerals 120 and 122. Each element 110 carries a pictorial representation, such as a stripe, and these stripe portions merge into a larger design when the assemblage of elements is viewed as a whole. For the sake of simplicity it is assumed that the elements per FIGURE 7 are in numerical sequence and that under this condition, the overall design comprises two diagonal lines. When arranging these elements in shifted position within the support means, it is apparent that this overall design will change its appearance in the same manner as has been described above in connection with FIGURES 1–5.

Figure 10:
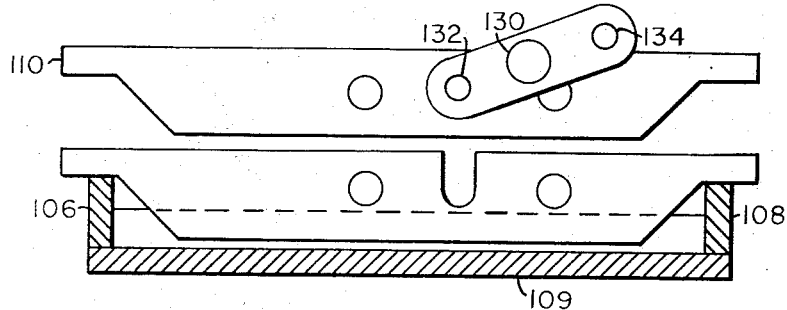
FIGURE 10 is an elevational view, depicting the manipulation of the elements of the embodiment shown in FIGURES 7 through 9.
Figure 9:
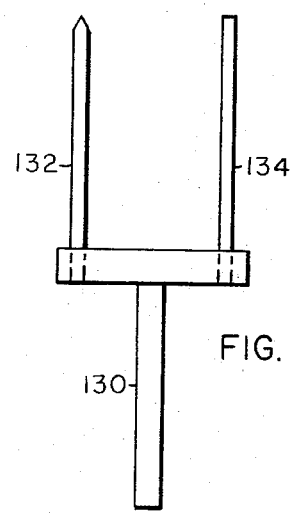
FIGURE 9 is an elevational view of the instrument for manipulating the elements per FIGURES 7 and 8.

Binary manipulation of the elements is achieved by an instrument shown in FIGURE 9. The instrument comprises a fork having a handle 130 and two prongs 132 and 134. Actually, a single prong would suffice which is inserted through the openings at a respective column position. It will be apparent that the prong must be long enough to extend crosswise through the entire array of elements 110. Assuming that all of the elements having a binary digit at the "2" column are to be picked up from the assemblage, the prong 132 is thrust through the openings on this column position while the other prong 134 is placed over the top surface of the elements to facilitate maintaining the elements in a horizontal position, see FIGURE 10. Upon lifting the instrument from the box-like support, all those elements having a binary digit "1" at the "2" column position are lifted from the array and remain engaged by the instrument, while the other elements due to the slot condition, representing the binary digit "0," remain in the box, failing to attach themselves to the instrument. The removed elements can now slidingly be brought together on the instrument prong 132, the elements remaining in the box moved to the front or to the rear and the removed elements reinserted into the box, now in shifted position, whereby to provide a change in pictorial representation as explained heretofore. The sorting instrument then is withdrawn. Manipulation and sorting may be continued by repeating these steps.

Thus, it is apparent that the embodiment per FIGURE 1 and that per FIGURE 7 are quite similar. In one case a vertical assemblage is used, while in the other a horizontal assemblage is used. In FIGURE 1, a binary "1" is denoted by the presence of a knob protruding from the surface, while in FIGURE 7, a circular hole serves the same purpose.

FIGURES 11A through 11F, 12 and 13 depict another alternative embodiment of this invention. The elements comprise flat plates which are adapted to be superposed on one another to form a deck. Different cut-outs and designs associated with each element provide various composite representations responsive to the arrangement, or sequence, of the respective elements.

In FIGURE 11A, the element 150 is provided with an L-shaped cut-out 152 and a line 154 on the surface, the line forming a portion of an overall representation. The element 150 is coded by means of two slots and a circular hole with a numerical value of "1," in binary notation "001." The plate 156 in FIGURE 11B is coded with a numerical value of "2," in a binary notation "010," and has a cut-out 158 and a line 160. The plate 162 per FIGURE 11C is coded with a numerical value of "3," in binary notation "011," and has a cut-out 164 and a line 166. The plate 168 as shown in FIGURE 11D is coded with a numerical value of "4," in binary notation "100," and has a cut-out 170 and a line 172. The plate 174 per FIGURE 11E has a numerical value of "5," in binary notation "101," and has a cut-out 176 and L-shaped line 178. The plate 180 per FIGURE 11F is coded "zero" and has merely a circular aperture 182. Elements with values of "6" and "7" have been omitted from the drawing as they follow the pattern shown.

FIGURE 12 shows the assembled elements in numerical sequence with the "zero" element 180 on top. A four-pointed star representation is visible through the aperture 182 of plate 180, this representation being formed by the individual lines 154, 172, 166 and 160, supplied respectively by the elements 150, 168, 162 and 156. These elements are those which have a numerical value of "1," "2," "3" and "4." The elements having a value of "5," "6" and "7" are hidden.

Assuming now that an instrument, such as a pencil, is trust through the "2" column position, thereby picking up the elements which have a numerical value of "2," "3," "6" and "7," and manipulating the deck of plates so that the picked-up elements are put to the rear of the deck, the elements will be rearranged in such a way that the numerical values of the elements from the front to the rear are in the sequence "0," "1," "4," "5," "2," "3," "6" and "7." A new composite representation is visible through the aperture 182 of the element 180. This representation is formed by the lines 154, 172, 166 and 178, originating respectively at the elements 150, 168, 162 and 174. The representation from the elements having a numerical value of "2," "6" and "7" is hidden.

This rearranging of the elements may be repeated following the step described hereinabove, always putting the picked-up elements at the rear of the deck and in the sequence removed.

It will be apparent that various other designs may be provided and that the above example is merely illustrative of the basic principle. Moreover, the plates may be provided with respective transparent and opaque portions instead of apertures as shown.

FIGURES 14 through 16 show a reversal of the embodiments depicted heretofore, the binary coding being supplied by the instrument instead of being disposed on the elements. The embodiment previously described in connection with FIGURE 1 has been selected to illustrate this type of arrangement.

Referring now to FIGURE 14, two horizontal rails 30 and 32 are disposed to support an array of eight elements designated by numerals 202, 204, 206, 208, 210, 212, 214 and 216 which may be assigned the numerical values from "0" to "7." The elements are alike except for the artistic representation which has been omitted in order to simplify the description. Each of the elements is provided with an aperture, such as the aperture 220 in the element 202, and the elements, therefore, do not exhibit binary coding. The binary coding is provided now by the instrument which is used for manipulating the elements. The instrument comprises a handle 230, a cross bar 232 and a plurality of pins 240 which extend outward from the cross bar and which are disposed to provide the binary coding when brought into engagement with the apertures 220 on respective elements. As clearly seen in FIGURE 16A, the instrument is coded for a "1" column manipulation, that is, for picking up the elements 204, 208, 212 and 216, having respectively the numerical values of "1," "3," "5" and "7." In FIGURE 16B, the instrument is coded for a "2" column manipulation, that is, picking up the elements having a numerical value of "2," "3," "6" and "7." As shown in FIGURE 16C, a "4" column manipulation is provided, picking up the elements with numerical values of "4," "5," "6" and "7." It will be apparent that different instruments may be provided for the different manipulations, that a single instrument may incorporate the different manipulation arrangements, or that the user may be provided with a universal type instrument and be required to set up the proper combination of pins, thereby achieving a further instructional and educational step. Other fastening means between the instrument and the individual elements may be used, including hooks and eyebolts, or magnetic means.

It shall be understood, still further, by those skilled in the art that, although a binary code system has been used for illustrative purposes, other numerical systems, such as a tertiary system, may be used, which systems are essentially extensions or variations of the basic binary system.

The artistic representation provided by the elements, instead of being the simple illustration depicted, may comprise a multicolor design and, moreover, it may comprise also a three-dimensional relief. When Braille characters are incorporated, the article is useful as a teaching aid for the blind.

It will be evident that the above-described system and article are eminently suited to teach and demonstrate binary numbering, binary manipulation and sorting routines and, moreover, that artistic representations are obtained which have a mathematical notation. Thus, the instant invention can provide many hours of enjoyment and amusement while being instructive. Still further, the elements may be used as mural decoration, a table top insert and the like, to provide thereby an object of art.

While there have been described and illustrated several preferred embodiments of the present invention and certain specific modifications thereof, it will be apparent to those skilled in the art that still other and further changes and variations may be made without deviating

What is claimed is:

1. In an educational article, the combination of:
a composite artistic representation comprising an assemblage of elements;
each element being of sufficient width along one side which is exposed to a viewer for displaying a clearly discernible portion of said representation and each element having also binary column positions along one side, the presence of a binary digit at a respective column position being denoted by the presence of a means adapted to be engaged by a sorting instrument;
said column positions of said elements being arranged to cause identically valued column positions associated with different elements to be aligned in a row when said elements are disposed as an assemblage, each row running through said assemblage, and
said elements forming said assemblage having different binary digit notations responsive to the presence of said means at one or more selected column positions, whereby a plurality of said elements of said assemblage is adapted to be engaged by the instrument and removed by the instrument from said assemblage, said engaged and removed elements all being characterized by the presence of a binary digit at the engaged column position, each such removal and subsequent restoring of said removed elements in shifted position in said assemblage providing a different composite artistic representation when said assemblege is viewed as a whole.

2. In an educational article as set forth in claim 1 and including a support means for supporting each of said elements adjacent to another element to provide thereby said assemblage.

3. In an educational article as set forth in claim 2 wherein said support means and each of said elements are constructed to provide for sliding motion of said elements relative to said support means.

4. In an educational article as set forth in claim 3 and including a stationary support means for supporting said elements in juxtaposed position; additional means coacting between said support means and said elements to enable said elements to move slidably along said support means, and said support means being longer along the axis along which said elements are adapted to move than said assemblage of said elements along the same axis when said elements form said representation and are contiguous.

5. In an educational article, the combination of:
a composite artistic representation comprising an array of elongated elements;
each such element being of sufficient width along one side which is facing a viewer for displaying a clearly discernible portion of said representation and each element having, further, binary column positions along one side, the presence of a binary digit at a respective column position being denoted by the presence of a means adapted to be engaged by a sorting instrument;
said column positions of said elements being arranged to cause identically valued column positions associated with different elements to be aligned in a row when said elements are disposed as an array, said row running through said array crosswise to the longitudinal axis of said elements, and
said elements forming an array having different binary digit notations responsive to the presence of said means at one or more selected column positions, whereby a plurality of said elements of said array is adapted to be engaged by the instrument and removed by the instrument from said array, said engaged and removed elements all being characterized by the presence of a binary digit at the engaged column position, and such removal and subsequent restoring of said removed elements in shifted position in said array providing a different composite artistic representation when said array is viewed as a whole.

6. An educational article as set forth in claim 5 wherein said means denoting a binary digit comprises a means protruding from the surface of the associated element.

7. An educational article as set forth in claim 6 wherein the absence of a binary digit is denoted by the absence of a means protruding from the surface of the respective element.

8. An educational article as set forth in claim 5 wherein said means denoting a binary digit comprises an aperture in the respective element, said aperture being dimensioned to receive the sorting instrument and be retained thereon.

9. An educational article as set forth in claim 8 wherein the absence of a binary digit is denoted by the provision of a slot which fails to provide positive engagement with the sorting instrument.

10. An educational article as set forth in claim 5 wherein said elements are in the form of a bar.

11. An educational article as set forth in claim 5 wherein said elements are in the form of slats.

12. An educational article as set forth in claim 5 wherein the representation bearing portion of each element and said means denoting the presence of a binary digit are on the same surface.

13. An educational article as set forth in claim 5 wherein said elements are substantially rigid, three-dimensional bodies.

14. An educational article as set forth in claim 5 wherein said elements are flexible.

15. An educational article as set forth in claim 5 wherein said elements of the array are coded to denote consecutive numbers in binary notation.

16. An educational article as set forth in claim 5 wherein ascending binary column positions are disposed along the longitudinal axis of said elements.

17. An educational article as set forth in claim 5 wherein said representation bearing elements are flat plates, said means denoting the presence of a binary digit is a hole and the absence of a binary digit is denoted by a slot extending to the edge of a respective plate, the representation portion is provided on one of the sides, and the plates are constructed to cause a composite representation to be visible when said elements are with their sides superposed on one another.

18. An educational article as set forth in claim 17 wherein said elements have their representation portions on those sides which are superposed on one another, and are constructed to have portions which, when said elements are superposed on one another, render representations from underlying elements visible and portions which obscure such representations.

19. An educational article comprising in combination:
an array of substantially parallel aligned elements, each element being of sufficient width along one side to bear and display a clearly discernible indicia;
a support means for supporting said elements in an array whereby the respective indicia associated with each element are exposed and coact to provide a composite design which is visible to a viewer facing said array;
guide means coacting between each of said indicia bearing elements and said support means for slidably moving said elements along said support means to close gaps between spaced elements and for providing a gap between said support means and the side of said array;
each of said elements having binary column positions along one side and the presence of a binary digit at a respective column position being denoted by the presence of a means which is adapted to be engaged by a sorting instrument;

said column positions of said elements being disposed to cause identically valued column positions associated with different elements to be aligned in a row when said elements are supported by said support means, and respective rows through identically valued column positions being parallel to one another;

said elements forming an array having different binary digit notations responsive to the presence or absence respectively of said means adapted to be engaged by the sorting instrument at one or more selected column positions, whereby a plurality of said elements of said array is adapted to be engaged by the instrument and removed by the instrument from the array and support means, said engaged and removed elements all being characterized by the presence of a binary digit at the engaged column position, and the removal and subsequent restoring of said elements in shifted position on said support means providing a changed composite design apparent to a viewer viewing said array.

20. An educational article comprising in combination:
an array of substantially parallel aligned indicia bearing substantially rigid elements;
a support means for supporting said elements in an array whereby the respective indicia associated with each element are exposed and coact to provide a composite design which is visible to a viewer facing said array;
guide means coacting between each of said indicia bearing elements and said support means for slidably moving said elements along said support means to close gaps between spaced elements and for providing a gap between said support means and the side of said array;
each of said elements adapted to be engaged by a sorting instrument for removing elements from said array and reinserting the same therein in shifted position, and
said sorting instrument including means for engaging certain of said elements in accordance with binary precepts,
whereby when elements are removed and reinserted in said array in shifted position, a changed composite design is apparent to a viewer viewing said array.

21. An educational article as set forth in claim 5 wherein said artistic representation is three-dimensional.

References Cited

UNITED STATES PATENTS

| | | | |
|---|---|---|---|
| 845,798 | 3/1907 | Lehr | 35—28 X |
| 2,022,627 | 11/1935 | Whitney | 37—75 |
| 2,544,251 | 3/1951 | Block | 129—16.1 |
| 2,911,220 | 11/1959 | Irwin | 35—28 X |
| 3,186,111 | 6/1965 | Lawlor | 35—17 |

EUGENE R. CAPOZIO, *Primary Examiner.*

WILLIAM GRIEB, *Examiner.*